No. 868,767. PATENTED OCT. 22, 1907.
H. DÜNHÖLTER.
FARE INDICATOR.
APPLICATION FILED APR. 26, 1907.
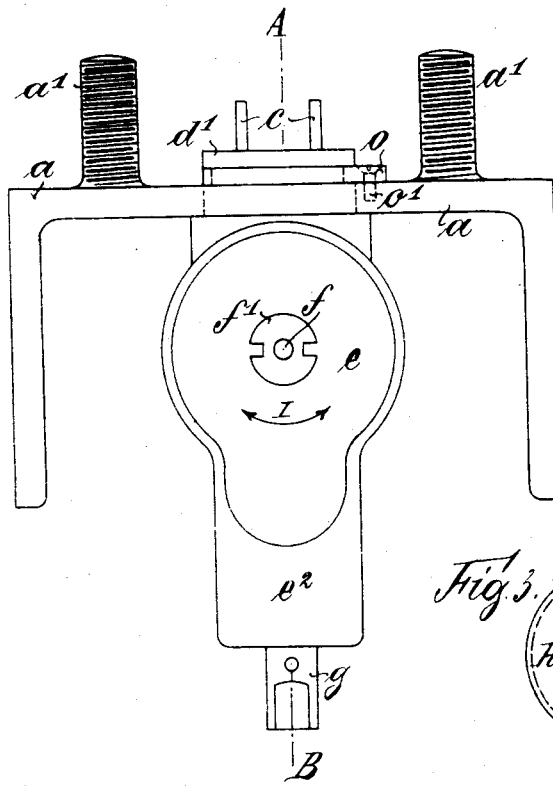
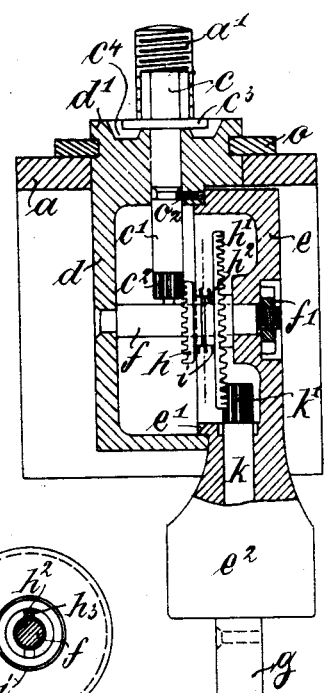
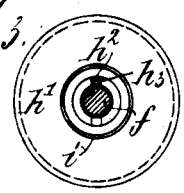
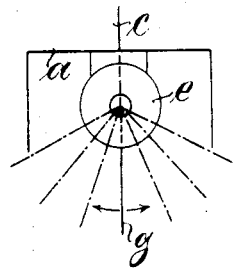
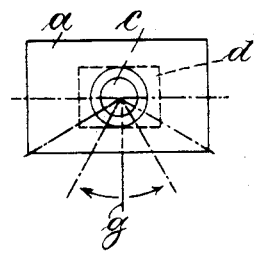
Witnesses
Emil Kayser
Carl Ruß
Inventor
Heinrich Dünhölter
by Robert Heigler
Attorney.

UNITED STATES PATENT OFFICE.

HEINRICH DÜNHÖLTER, OF BERLIN, GERMANY.

FARE-INDICATOR.

No. 868,767.

Specification of Letters Patent.

Patented Oct. 22, 1907.

Application filed April 26, 1907. Serial No. 370,396.

*To all whom it may concern:*

Be it known that I, HEINRICH DÜNHÖLTER, a subject of the King of Prussia, and a resident of 5 Neue Jacobstrasse, Berlin, Kingdom of Prussia, Germany, have invented certain new and useful Improvements in Fare-Indicators, of which the following is an exact specification.

The present invention has for its object an improvement in fare indicators, which consists in a universal joint for the junction of the fare indicating mechanism, with the road wheel of the vehicle, cap or the like fitted with a fare indicator.

As it is well known, the fare indicators are operated by a flexible shaft, one end of which is twisted by the road wheel of the vehicle and this twist or torque is transmitted to the other end of the flexible shaft so as to operate the mechanism of the fare indicator.

As known fare indicators are rather complicated mechanisms and it is therefore of great importance to have this device constructed in such manner as to permit of their being mounted in he cap without the need of subsequent or additional alterations of the finished structure. Now, the caps and the like vehicles are of very different structures and there are various places upon which the fare indicators are to be applied to the vehicles, so that often there is the necessity of imparting to the flexible shaft at its end adjacent to the fare indicator acute flexures, thereby subjecting the shaft exceeding strains, when continuously operated. Hitherto one has avoided this drawback by arranging an intermediate member between the fare indicator and the abutting shaft end, for insuring as far as possible, a straight line junction between them. Such provisions need an additional mechanism and are rather expensive.

According to the present invention an improvement is provided which permits the fare indicator to be joined to a flexible shaft without any additional mechanism, and furthermore the fare indicator, brought into a perfectly finished condition in the factory, is enabled to be arranged at any convenient place on the vehicle without the said shaft end being subjected to any objectionable flexure. With this object in view the fare indicator is fitted with a universal joint member, so that the flexible driving shaft is allowed to be joined to the fare indicator from any desired direction without there being the need of acute flexures of the shaft. In some cases it may be possible to use even a solid shaft for transmitting the motion of the road vehicle to the fare indicator.

To make my invention clear, reference is had to the accompanying drawing, in which a convenient constructional form of the improvement according to my invention is illustrated.

Figure 1 is a side elevation of the universal joint, Fig. 2 is a vertical cross section on line A—B of the Fig. 1, Fig. 3 illustrates a detail of the improvement in a vertical section on line C—D of the Fig. 2, Fig. 4 illustrates diagrammatically in a side elevation different positions of the hinge joint. Fig. 5 illustrates diagrammatically in a plan elevation different positions of the hinge joint.

Referring to Figs. 1 and 2 $a$ is a base plate and $a'$ are screw bolts for the purpose of securing the fare indicator to the plate $a$. A clutch part, consisting of two legs or projections $c\ c$ intended to engage with the fare indicator mechanism, and a bearing plate $c^3$ mounted in a recess $c^4$ of the cylindrical part or pivot $d'$ is connected with a vertical shaft $c'$, passing through a central opening of the pivot $d'$. The latter is made integrally with the casing $d$ and supported in the hole of the base plate $a$ by a divided ring $o$ engaging with an external annular groove of the pivot. A screw bolt $o'$ serves for attaching the ring $o$ to the plate $a$, thus enabling the pivot and the casing $d$ respectively to rotate round but not to move longitudinally. A spur wheel $c^2$ is attached to the lower end of the shaft $c'$, the latter being prevented from moving up and down by means of the setting screw $o^2$ engaging with an annular groove of the shaft $c'$.

As to be seen from Fig. 2 the casing $d$ is open at its righthand side and adapted to be closed there by means of a cover $e$, projecting with its annular rim $e'$ into the interior of the covering $d$. $f$ is a transverse shaft journaled at its one end to the casing $d$ and carried at its other end by the cover $e$. A nut $f'$ screwed on the projecting end of the shaft $f$ prevents the shaft from longitudinal movement and maintains the cover $e$ in its position.

$h$ and $h'$ are two crown-wheels loosely mounted on the shaft $f$, the wheels $h$ and $h'$ being in engagement with the spur wheels $c^2$ and $k'$ respectively. The spur wheel $k'$ is carried by the vertical shaft $k$ mounted in a boring of the downwardly extending projection or lug $e^2$ of the cover $e$. $g$ is a connecting part secured to the shaft $k$ and serving for the junction of the aforementioned flexible shaft to the fare indicator.

As to be seen from Figs. 2 and 3 the crown wheel $h$ is provided with a horizontal projection or pin $h^2$ which engages with a hole or recess $h^3$ of the crown wheel $h'$. A spiral spring $i$ is arranged between both the crown wheels $h$ and $h'$ and presses against these wheels, thus causing them to remain in engagement with the spurwheels $c^2$ and $k'$, respectively.

It may be observed therefrom that the wheels $h$ and $h'$ are permitted to be easily changed in accordance with the special dimensions or diameters of the road wheels, because the fare indicator requires to be adapted to the circumferential velocity of the road wheels.

The operation of the foregoing described mechanism will be obvious. The movement or twist of the flexible shaft is transmitted to the clutch part $c$ by means of the shaft $k$ and the toothed wheels $k'$, $h^2$ and the toothed wheels $h$ and $c^2$, which latter rotates the shaft $c'$. For imparting the part $g$ any desired direction and as indicated in the Figs. 4 and 5, the cover $e$ has to be rotated around the horizontal shaft $f$, and the casing $d$ has to be revolved around the vertical shaft $c'$. During these movements the spur wheel $k'$ rolls off on the crown wheel $h^2$ and the spur wheel $c^2$ rolls off on the crown wheel $h$, so that no hindrance is offered to the aforementioned movements.

Having thus fully described the nature of my said invention, what I desire to secure by Letters Patent of the United States is:—

1. A universal joint-connection for fare-indicators for vehicles, cabs and the like, comprising a casing adapted to be rotated around a vertical axis and a part adapted to be rotated around a horizontal axis and carried by the said casing, a shaft operated by the vehicle provided with the fare indicator, and means for transmitting the movement of the said shaft for the purpose as described.

2. A universal joint-connection for fare-indicators for vehicles, cabs and the like, comprising: a base plate ($a$) provided with an opening and carried by the vehicle a casing ($d$) open at its one side and mounted in the said opening of the base plate, a cover ($e$) provided with an annular rim and mounted therewith in the opening of the casing ($d$), a flexible shaft operated by the vehicle and means for transmitting the movement of the said shaft, for the purpose as described.

3. In the hereindescribed universal-joint for fare indicators for vehicles, cabs and the like, in combination with a flexible shaft operated by the vehicle, a base plate provided with a circular hole, a casing having a cylindrical part or pivot ($d'$) arranged in said hole, a divided ring ($o$) for insuring the position of the casing ($d$) in the base plate ($a$) and a clutch part for the purpose of transmitting the motion of the said flexible shaft, for the purpose as described.

4. In the hereindescribed universal joint for fare-indicators for vehicles, cabs and the like, in combination with a flexible shaft operated by the vehicle, a casing ($d$) having a circular opening at its one side, a cover ($e$) having an annular rim adapted to close the said circular opening, and a cross shaft ($f$) for the purpose of connecting the cover ($e$) to the casing ($d$), and means for transmitting the motion of the said flexible shaft.

5. A universal joint-connection for fare-indicators for vehicles, cabs and the like, comprising: a base plate ($a$) having a circular hole, a casing ($d$) open at its one side and provided with a cylindrical part or pivot, mounted with the latter in the said circular opening, a divided ring ($o$) engaging with the said pivot for holding the casing in its position, a clutch part ($c$, $c^3$) intended to engage with the fare indicator and pivotally carried by the said casing, a vertical shaft ($c'$) connected with the said clutch part and journaled in the casing, a spur wheel ($c^2$) carried by the shaft ($c'$), a cover ($e$) having an annular rim pivotally mounted therewith in the opening of the casing ($d$), a transverse shaft ($f$) carried by the casing ($d$) and the cover ($e$) and serving for their connection, crown wheels ($h$ $h'$) carried by the transverse shaft, a spur-wheel ($k'$) meshing with the crown-wheel ($h'$), the crown-wheel ($h$) being in engagement with the spur-wheel ($c^2$), and a shaft ($k$) journaled in the cover ($e$) and carrying the spur-wheel ($k'$).

6. In a universal joint-connection for fare-indicators, and in combination with the hereindescribed casing ($d$) and cover ($e$), a clutch part consisting of two legs or projections ($c$ $c$) and bearing plate ($c^3$) connected with the said legs and pivotally carried by the casing ($d$) a vertical shaft ($c'$) attached to the plate ($c^3$) and journaled in the casing ($d$), a transverse shaft ($f$) carried by the casing and the cover, a spur wheel ($c^2$) and a crown wheel ($h$) engaging with each other and carried by the shaft ($c'$) and ($f$) respectively, a vertical shaft ($k$) journaled in the cover ($e$), a crown wheel ($h'$) and a spur wheel ($k'$) meshing with each other and mounted on the shafts ($f$ and $k$) respectively, means for connecting the crown wheels ($h$ and $h'$) operatively with each other, a spiral spring ($i$) for holding the last mentioned wheels in their proper position, and a connecting part ($g$) attached to the shaft ($k$).

In witness whereof I have hereunto set my hand in the presence of two witnesses.

HEINRICH DÜNHÖLTER.

Witnesses:
WOLDEMAR HAUPT,
HENRY HASPER.